US005518553A

United States Patent [19]
Moulder

[11] Patent Number: 5,518,553
[45] Date of Patent: May 21, 1996

[54] STORAGE TANK CLEANING AND STRIPPING APPARATUS AND METHOD

[76] Inventor: Jeffrey E. Moulder, Rte. 7, Box 1964, New Caney, Tex. 77357

[21] Appl. No.: 322,446

[22] Filed: Oct. 4, 1994

Related U.S. Application Data

[63] Continuation-in-part of Ser. No. 53,726, Apr. 27, 1993, Pat. No. 5,352,298.

[51] Int. Cl.⁶ .................................. B08B 3/02; B08B 9/12
[52] U.S. Cl. .................... 134/22.18; 134/24; 134/167 R; 239/227; 239/263.3; 239/265
[58] Field of Search .......................... 134/167 R, 168 R, 134/22.18, 24; 239/227, 263, 263.3, 264, 265; 118/317; 451/176

[56] References Cited

U.S. PATENT DOCUMENTS

| | | | |
|---|---|---|---|
| 2,800,366 | 7/1957 | Scruggs | 239/227 X |
| 3,477,178 | 11/1969 | Hulbert | 134/167 R X |
| 3,985,572 | 10/1976 | Petermann et al. | 134/167 R X |
| 4,163,455 | 8/1979 | Hebert et al. | 134/167 R |

*Primary Examiner*—Philip R. Coe
*Attorney, Agent, or Firm*—Harrison & Egbert

[57] ABSTRACT

An improved apparatus and method for cleaning and stripping residue, contaminants, and debris from all of the interior surfaces in a storage tank and the like. The present invention may be conveniently inserted into a tank through its manway and, after quick assembly thereof, hydraulically positioned vertically and then maneuvered and articulated to clean and strip interior storage tank surfaces. A means is provided which inherently coordinates and synchronizes hydraulically driven rotation of the vertical pole on the tank floor with the hydraulically driven rotation of a spray bar disposed at the remote end of a boom assembly. Close proximity of the spray to the surfaces is controlled by hydraulically operated cylinders contained on a rotor assembly.

23 Claims, 6 Drawing Sheets

STORAGE TANK CLEANING AND STRIPPING APPARATUS AND METHOD

RELATED APPLICATIONS

The application is a continuation-in-part of pending U.S. application Ser. No. 053,726 filed Apr. 27, 1993, and now U.S. Pat. No. 5,352,298.

BACKGROUND OF THE INVENTION

This invention relates to cleaning methods and apparatus, and more particularly relates to methods and means for cleaning interior surfaces of storage tanks and the like, and also stripping rubber linings and the like affixed to these interior surfaces.

It is well known in the prior art that a diversity of commodities are transported by land in railroad tank cars, truck trailers, transport tankers, etc. It is also well known in the prior art that there are special purpose railroad tank cars and the like which are lined with rubber and the like, to prevent contamination, chemical reactions, etc. Similarly, after arriving at the intended destination, these commodities must be stored in lined storage tanks and the like.

Prior to being filled or loaded with a particular commodity, a tank car, storage tank and the like must be thoroughly cleaned for health and safety reasons. Tanks or cars with linings must, of course, also be cleaned and, indeed, such linings may be stripped and replaced prior to being filled or loaded with another commodity. Such cleaning and stripping have heretofore conventionally been both labor-intensive and time-consuming.

During typical manual cleaning, the flow of liquid through hand-held hoses is limited to volumes of less than approximately 7 gallons per minute. This throughput is not only limited by a worker's handling ability, but also is limited by the unstable standing conditions in a slippery, conventional rounded-bottom tank car. Indeed, considering that typical manual car-wash volumes of water are only 2 gallons per minute at low pressures of 1,500 psi, a 7 gallon per minute flow presents a considerable challenge to a worker, particularly within the confines of a tank car and the like. Furthermore, there are hazards to workmen from splashing chemicals, debris, fumes, and even explosions. Thus, in addition to being an inherently hazardous and slow method of cleaning tank cars, such manual methods are inherently nonuniform and unreliable.

Accordingly, there have been several attempts in the art to automate the cleaning and stripping of tank cars and the like. To clean the interior of a tank car with reduced human intervention, however, requires that a suitable apparatus either be a permanent member thereof or be inserted and then assembled therein. As should be evident to those conversant with the art, entry into a railroad tank car is routinely available through a narrow manway located on top thereof or could be rendered expedient through a specially designed wall or side panel or door. But, of course, a tank car with such a specially designed panel or door would necessitate structural modifications and would be susceptible to contamination and leakage.

An apparatus designed to eliminate or minimize such danger to workmen is illustrated by Hulbert in U.S. Pat. No. 3,571,985. Specifically intended to clean tank car linings with an abrasive material like sand, Hulbert discloses an apparatus consisting of a support structure affixed to the ends of a tank car using hydraulics and pneumatics. A pneumatic pump provides for longitudinal movement of a carriage along the support structure, while another pneumatic pump simultaneously provides for independent rotational movement of a plurality of nozzles. Drive means are also provided for the manual control of linear carriage advancement and rotational nozzle spray pattern. A vacuum pump removes debris from the floor of the tank car. Since considerable time appears to be prerequisite to assembling the Hulbert apparatus, it is probably intended not to be portable, but to be a relatively permanent fixture in a tank car.

As another example, Saxonmeyer, in U.S. Pat. No. 3,461,889, teaches an apparatus for washing railway tank car interiors which provides for the entry through a side door in the tank car of a platform movably mounted by a base and a carriage movably mounted with respect to the platform. A boom assembly movably mounted on the carriage controls the spray of liquid about a vertical axis through a plurality of nozzles. The Saxonmeyer apparatus includes sensing arms to provide semi-automatic operation by limiting its washing operation only to times when a side edge of the tank car door opening is not contacted.

While improving the prior railway tank car cleaning art, the Hulbert and Saxonmeyer devices have provided only limited arcuate manipulation of the spray nozzles and require structural modifications to a railroad tank car. Guignon et at., in U.S. Pat. No. 3,444,869, disclose a jet cleaning device which attempts to improve the effectiveness and nature of the spray for cleaning purposes. Based upon a complicated plurality of oscillatable nozzles, this device has a corresponding plurality of streams of cleaning liquid which is directed to the internal surfaces of a tank car. The sizes of these streams depends upon the distances of the plurality of nozzles from the internal surfaces therefrom.

Another improvement in the nozzle manipulation art is disclosed by Jaeger in U.S. Pat. No. 3,895,756. In particular, there is disclosed a method and apparatus for cleaning vessels which not only enables presetting control means to accommodate a vessel's dimensions, but also enables programming a sequence of nozzle movements. The Jaeger apparatus is lowered into a tank car through its manway and the assembly connected by liquid pressure lines to a control device and to a source of pressurized cleaning fluid. A high pressure spray nozzle is mounted for universal movement relative to two perpendicular axes. Separate hydraulic actuators are connected to and activated from a remote control device, which is air operated and with means for adjusting the speed and degree of sweep of the spray nozzle, thereby enabling a spray of any configuration to be generated. Thus, in addition to providing more versatile manipulation and control of spray nozzles, the Jaeger apparatus is portable and is inserted into a tank car through its manway.

Similarly, in U.S. Pat. No. 3,001,534, Grant teaches a portable apparatus for cleaning a tank car by being inserted thereinto. A baseplate temporarily replaces a tank car's dome cover and supports an assembly extending into the interior of the car and carrying rotating spray heads. These spray heads are driven by an electric motor and rotate about two orthogonal axes, thereby permitting water spray throughout a tank car's interior. Thus, in addition to improving the prior art with a portable top-insertable apparatus, the Grant apparatus is easily positioned within the tank car and directs a controllable, compound water spray pattern throughout the interior thereof using swivel means. The number of revolutions of the swivel means is determined by the relative ratios of two sets of pinions and gears.

Further improvements in the prior art are disclosed by Looper and Maton. In U.S. Pat. No. 4,244,523, Looper teaches a top-inserting apparatus for conveniently and inexpensively cleaning rubber-lined tank cars. This apparatus consists of a fixed frame for supporting a tiltable frame from which extends a pivotally mounted wash nozzle assembly containing a cleaning liquid tube at the end of which is connected spray nozzles. The spray jets operate simultaneously on longitudinal and transverse axes of the tank car promoting thorough cleaning thereof. Similarly, in U.S. Pat. No. 4,341,232, Maton discloses a tank cleaning apparatus which limits the rotation of top-insertable spray arms to 180° instead of the conventional 360°. By only rotating spray arms through 180° during the washing cycle, matter dislodged from the interior of a tank car is prevented from being forced upon already cleaned surfaces because a spray pattern is formed which directs such dislodged material to one end of the car or to its bottom.

There have been similar attempts to improve the cleaning and stripping art related to storage tanks and the like. For example, Krajicek et al teach a remote-controlled tank cleaning robot in U.S. Pat. No. 4,817,653. Assembled on-site, this robot is hydraulically powered to reach all interior tank surfaces using an interdependent series of elbow joint structures. But a worker is required to be present within the tank during cleaning operation. In U.S. Pat. No. 4,716,917, Schmidt discloses an apparatus for cleaning tanks on a ship, using nozzles which are rotatably affixed to nozzle holders which are located at various elevations on a vertical standpipe. A rotary and vertically reciprocating drive rotates the nozzles, thereby cleaning the interior tank surfaces.

Similarly, Hatley teaches in U.S. Pat. No. 3,874,594 an apparatus which cleans tankers using a housing which rotates about a vertical axis. Obliquely attached to this housing is a nozzle which rotates about a horizontal axis, for spraying both proximate and distant interior tank wall, using gears and clutch mechanisms. Patenaude teaches in U.S. Pat. No. 4,595,419 an apparatus for purging radioactive contamination from internal surfaces of a steam generator constructed of typical U-tube configuration, using programmed robotic arm movements and an ultrasonic transducer. The ultrasonic transducer is remotely controlled to optimize scrubbing action of the robotic arms.

In U.S. Pat. No. 5,087,294, Rechtzigel teaches an apparatus for cleaning storage tanks constructed with a floating roof, which includes an elongated nozzle having a pair of spray jets radially opposing each other. Vertical legs are attached to the floating roof and engage the bottom of the tank. This elongated nozzle rotates about a vertical axis and emulsifies the accumulated material residing on the bottom of the tank. The circular pattern of rotation is controlled by a series of radially spaced openings in the floating roof.

As another contribution to the tank cleaning art, Sloan discloses an apparatus and method limited to cleaning sludge from the bottom of a liquid storage tank in U.S. Pat. No. 5,037,486. This self-propelled sludge-cleaning apparatus is assembled on-site and hydraulically propelled along the bottom of a tank using a tether line which is connected to a control assembly. Similarly, Moran, in U.S. Pat. No. 4,828,625, teaches a floating-roof structure located above the sludge with tubular sleeves with remote legs for support. These sleeves are located immediately above the sludge for recirculating pressurized fluid through the sludge.

Furness et al, in U.S. Pat. No. 4,407,678, disclose an apparatus having a vertically positioned casing with diametrically opposed nozzles, for removing sludge from storage tanks. This pair of nozzles is configured to produce a liquid spray in only one plane as the housing rotates horizontally. The housing is situated just above the tank floor. In U.S. Pat. No. 5,248,095, Rankin et at. disclose a rotating nozzle intended to be used for water blasting. This nozzle rotates relative to a horizontally-positioned longitudinal shaft and discharges high pressure water in a circular path with a continuously changing point of impact. Being inclined relative to the water stream, the Rankin nozzle continuously changes direction of movement. In U.S. Pat. No. 4,770,711, Deal et at. disclose a method for cleaning chemical sludge from storage tanks, using a frame which moves along the bottom of the tank on a pair of endless chain belts and directs a fluidizing agent at the sludge to form a pool and then to discharge the sludge.

Notwithstanding these improvements in the tank cleaning and stripping art, there is still not available an automatic or semi-automatic and reliable apparatus and method for cleaning storage tanks and the like and for stripping the linings therein contained. It would be advantageous for an apparatus to be sufficiently portable to be completely inserted through an existing manway and then be conveniently and quickly assembled therein. It would also be advantageous for such an apparatus to be readily configured and maneuvered so as to reach all of the interior surfaces of storage tanks of various diameters.

Those skilled in the art would also appreciate the utility of an apparatus capable of generating and accurately controlling a high pressure and high volume liquid spray such that the entire interior surfaces of a storage tank and the like would be effectively treated, even containing a lining thereon. Such effective liquid spray would preclude the present conventional use of abrasive cleaning of linings, thereby significantly prolonging the longevity thereof. It would be further advantageous if such apparatus were driven within the storage tank by a non-electrical motor to avoid a potential safety hazard due to sparks causing combustion or explosion.

Accordingly, these limitations and disadvantages of the prior art are overcome with the present invention, and improved means and techniques are provided which are useful for cleaning and stripping residue, contaminants, debris, etc. from all of the interior surfaces in a storage tank and the like, such that the means may be conveniently inserted into a storage tank through its manway and, after quick assembly thereof, hydraulically erectified to reach all of the interior surfaces of the tank, and then be preset for automatic or semi-automatic cleaning and/or stripping operation.

SUMMARY OF THE INVENTION

The present invention provides an improved apparatus and method for cleaning and stripping residue, contaminants, debris, etc. from all of the interior surfaces in a storage tank and the like, with minimal operator intervention heretofore unknown in the prior art. The present invention discloses means which may be conveniently inserted into a storage tank typically through a manway in a side wall and, after quick assembly thereof, hydraulically configured to accommodate the particular physical dimensions of the storage tank, and then be preset for automatic or semi-automatic cleaning and/or stripping operation.

In accordance with the present invention, means and methods are provided which enable a storage tank and the like to be effectively cleaned without workers having to assemble multi-level scaffolding and staging in order to manually reach the various internal surfaces and with only minimal worker intervention. As will be described in detail, the present invention teaches a synergistic means which inherently coordinates and synchronizes the cleaning and stripping of virtually every internal surface contained in a storage tank and the like.

The preferred embodiment of the present invention comprises a pole-boom assembly combination which is conveniently and safely assembled inside a storage tank. The pole preferably comprises a lower pole portion and an upper pole portion which are fixedly joined together in situ. The lower pole portion is mounted in a stirrup and then forced into a vertical disposition when a setup hydraulic cylinder is actuated. Affixed to this pole is a boom assembly which, through the action of fin assembly, enables a rotor assembly to blast essentially all interior surfaces of a storage tank and the like. At the remote end of this boom assembly is a pivotally attached spray bar means which performs surface blasting with a proximity control hereinbefore unknown in the art.

In accordance with the teachings of the present invention, the interior surfaces of a tank car are cleaned and stripped during a band-run which typically has a band width of five feet. Thus, with each 360° traverse of the interior surfaces included in this band, efficient cleaning and stripping may be accomplished without operator intervention. However, if insufficient cleaning and stripping is observed on a remote video monitor or if the spraying action is interrupted, the operator may have to take remedial steps before operation may be continued. As will become clear to those skilled in the art, such corrective measures may either require an operator to enter the storage tank or, if the hydraulic valve bank has been located outside of the storage tank and additional video cameras optimally positioned on an embodiment of the present invention within the tank, then virtually all of such corrective measures and adjustments may be performed remotely. In addition, such storage tank treatment is typically accomplished with speed, safety and reliability heretofore unknown in the prior art.

It is feature and advantage of the present invention that the rotational tracking of the erect pole about swivel stirrup situated on the floor of a storage tank is synchronized with the rotational movement of its spraying means. Accordingly, based upon hydraulic communication between a pole tracker and a rotor assembly, establishing and changing and adjusting rotational speeds is simple and reliable. Any adjustments to the rotational speed of rotor assembly rotational speed is immediately propagated to the rotational speed of pole tracker. Similarly, any adjustment to the rotational speed of the pole tracker is instantaneously propagated to the rotational speed of the rotor assembly. Rotational motion of the present invention is effected by a hydraulically driven tracker motor and rotor motor. Thus, under the present invention, sources of power are limited to hydraulics and water, thereby avoiding electrical hazards and other dangers common in wet, chemical environments.

Accordingly, in accordance with the present invention, methods and means are provided to enable a storage tank and the like to be effectively and quickly cleaned with minimal worker intervention. It is also within the teachings of the present invention that lined storage tanks and the like may be effectively and quickly cleaned and stripped with minimal worker intervention.

It is an object of the present invention to provide means and method for effectively and safely cleaning and stripping storage tanks and the like.

It is also an object of the present invention to provide a means and method for cleaning and stripping storage tanks and the like which requires only minimal worker intervention.

It is a further object of the present invention to provide an apparatus for cleaning and stripping storage tanks and the like which may be remotely adapted to accommodate all interior surfaces thereof.

It is a feature and advantage of the present invention that the interior surfaces of a storage tank and the like may be automatically cleaned and stripped, on a band-by-band basis with only minimal worker intervention and minimal entry of a worker into the tank during a band-run. Thus, worker intervention associated with the present invention limited to only initial set up time and then its positioning for treating successive bands around the storage tank. It is also a feature of the present invention that changes in the bands being cleaned may be accomplished remotely if sufficiently long hydraulic conduit means are used, if the hydraulic valve means is positioned outside the tank and if sufficient video cameras are positioned inside the tank to provide accurate visuals of progress of surface treatment. It is accordingly an object of the present invention to provide an improved means which may conveniently be inserted into a storage through a manway, quickly assembled and positioned, and then automatically or semi-automatically clean and strip the interior surfaces thereof with a combination of speed, thoroughness and safety heretofore unknown in the art.

It is a further object of the present invention to provide a means for cleaning storage tanks and the like which operates in the absence of electric power therein.

It is also an object and feature of the present invention that an apparatus and method are provided which enables those skilled in the art to strip liners contained in storage tanks and the like by exercising accurate control of the distance between spray nozzles and the lining's surfaces. Hence, it is an advantage of the present invention that the longevity of storage tank liners is sustained by a nozzle precision heretofore unknown in the art.

It is another object of the present invention to provide a means which inherently synchronizes primary rotational movement of its vertical pole, driven by a hydraulic tracker motor situated on the floor of the storage tank, with the rotational movement of a rotor swivel assembly driven by a hydraulically operated rotor motor.

It is an object and feature of the present invention to provide a means which conveniently may be maneuvered and articulated to reach all of the interior surfaces of a storage tank and the like.

It is a specific object of the present invention to provide, in a storage tank having a plurality of interior surfaces including a floor, side walls and a dome, a cleaning and stripping apparatus comprising: pole means; support and tracker means comprising: a plurality of platform leg means disposed abutably upon said floor of said storage tank, pole mount means configured for fixedly and radially receiving said platform leg means and configured for supporting said pole means when said pole means is disposed vertically of said floor, tracker ring means configured to be abutably received by said pole mount means, tracker means configured for engaging said tracker ring means, for rotating said pole means, and outrigger arm means fixedly attached to said pole means and pivotally attached to said platform leg means, for adjusting the plumb of said pole means and for imparting stability thereto; fin assembly pivotally attached to said pole means, at the end thereof remote from said pole mount means; boom assembly pivotally attached to said fin assembly and said pole means; rotor assembly pivotally attached to said boom assembly and comprising a spray bar means, for blasting said surfaces of said storage tank by rotating said spray bar means; and hydraulic fluid supply valve control means connected to a plurality of hydraulic cylinder means for hydraulically controlling maneuverability and articulation of said boom assembly and said rotor means, for, in turn, controlling band width circumscribing said interior surfaces by said spray bar means, and for synchronizing said rotational movement of said tracking means and said rotational movement of said rotor assembly.

It is another specific object of the present invention to provide, in a storage tank having a plurality of interior surfaces including a floor, side walls and a dome, a cleaning and stripping apparatus comprising: pole means comprising upper pole portion and a lower pole portion with said upper pole portion configured to fixedly receive said lower pole portion; said upper pole portion comprising a ring assembly pivotally attached to said upper pole portion and disposed medially thereof, with said plurality of outrigger arm means extending radially therefrom and pivotally attached thereto; each of said plurality of platform leg means comprising a plurality of turnbuckle means slidably attached thereto, for adjusting said plumb of said erect pole and for affording rigidity to said attached fin assembly and said boom assembly; support and tracker means comprising: a plurality of platform leg means disposed abutably upon said floor of said storage tank, pole mount means configured for fixedly and radially receiving said platform leg means and configured for supporting said pole means when said pole means is disposed vertically of said floor, said pole mount means comprising adjacent pole swivel stirrup means for pivotally securing said lower pole portion and further comprising load bearing means therebelow for supporting the load engendered by said pole and said boom assembly and said rotor assembly attached to said pole, tracker ring means configured to be abutably received by said pole mount means, said tracker ring means comprising a tracker bull gear, for meshing with a corresponding drive gear of said tracker means, and, in turn, for synchronously causing rotation of said pole and said spray bar means; tracker means configured for engaging said tracker ring means, for rotating said pole means, said tracker means comprising a combination of a hydraulic motor and gear reduction means, said gear reduction means configured to mesh with said tracker bull gear, for controlling synchronized rotational speed of said pole and said spray bar means, and outrigger arm means fixedly attached to said pole means and pivotally attached to said platform leg means, for adjusting the plumb of said pole means and for imparting stability thereto; said pole mount means, said swiveling stirrup means and said tracker ring means having an unitized construction; fin assembly pivotally attached to said pole means, at the end thereof remote from said pole mount means; said fin assembly comprising a fin means and a fin cylinder, for articulating said boom assembly relative to said interior surfaces; boom assembly pivotally attached to said fin assembly and said pole means; said boom assembly comprising a boom means and a boom cylinder, for articulating said rotor assembly relative to said interior surfaces; rotor assembly pivotally attached to said boom assembly and comprising a spray bar means, for blasting said surfaces of said storage tank by rotating said spray bar means; said rotor assembly comprising proximity control means for positioning said spray bar proximal to said interior surfaces; said spray means comprising a pair of spaced-apart nozzles disposed at each end thereof, for establishing the band width of blast circumscribed upon said interior surfaces during a band-run; and hydraulic fluid supply valve control means connected to a plurality of hydraulic cylinder means for hydraulically controlling maneuverability and articulation of said boom assembly and said rotor means, for, in ram, controlling band width circumscribing said interior surfaces by said spray bar means, and for synchronizing said rotational movement of said tracking means and said rotational movement of said rotor assembly.

These and other objects and features of the present invention will become apparent from the following detailed description, wherein reference is made to the figures in the accompanying drawings.

IN THE DRAWINGS

DETAILED DESCRIPTION

Figure 1:
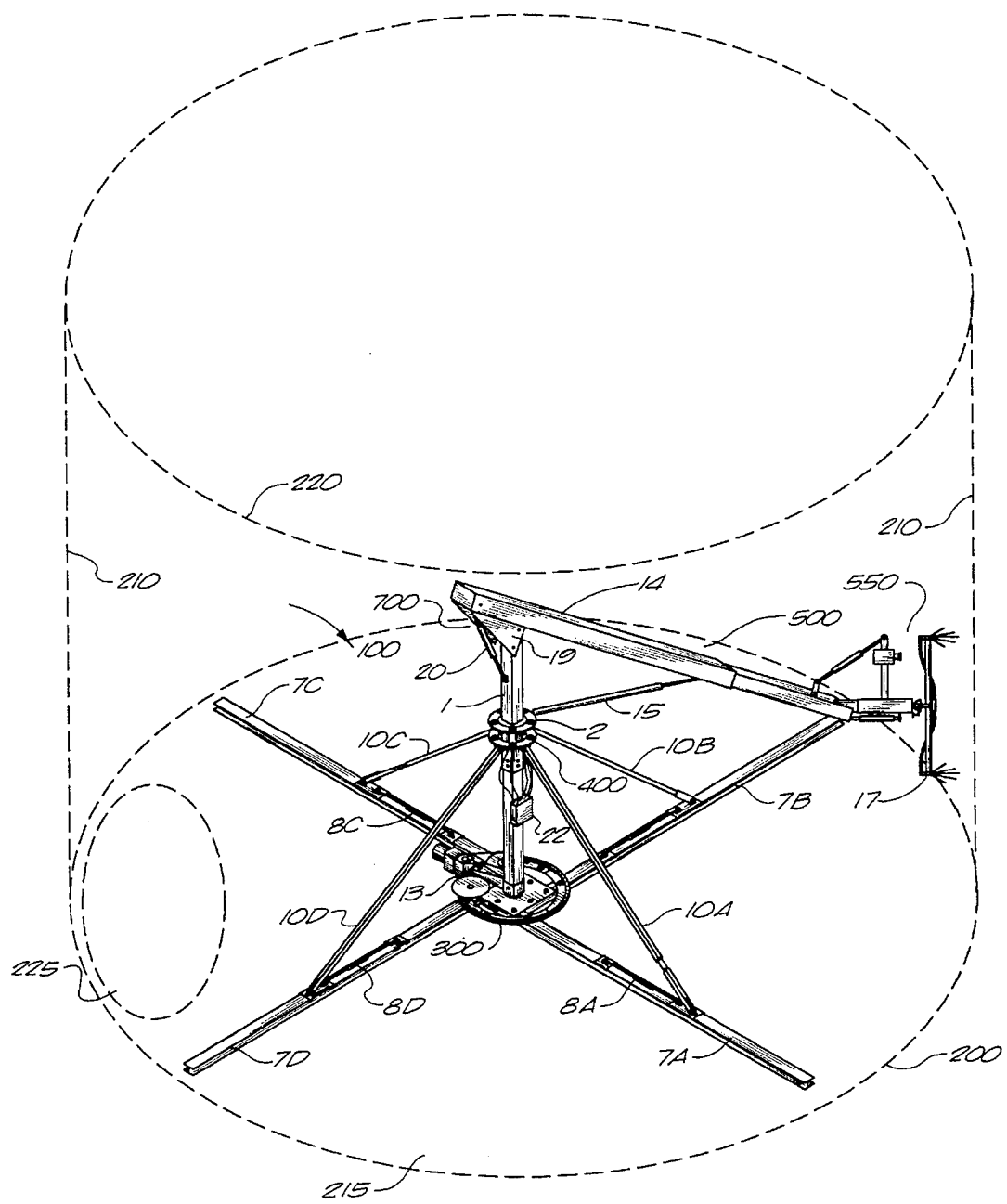
FIG. 1 depicts a frontal perspective view of an apparatus embodying the present invention, with this apparatus disposed within a storage tank.

Now referring to FIG. 1, there is depicted a frontal perspective and partial cutaway view of preferred embodiment 100 of the present invention assembled within storage tank 200. Storage tank 200 typically comprises a substantially vertical wall with interior surface 210, floor 215 and dome 220. Disposed on a side of wall 210 is conventional manway 225 with manway cover 230. According to the teachings of the present invention, cleaning and stripping apparatus 100 is inserted through manway 225 in piecemeal fashion and assembled within storage tank 200, as will be hereinafter described in detail.

Figure 2:
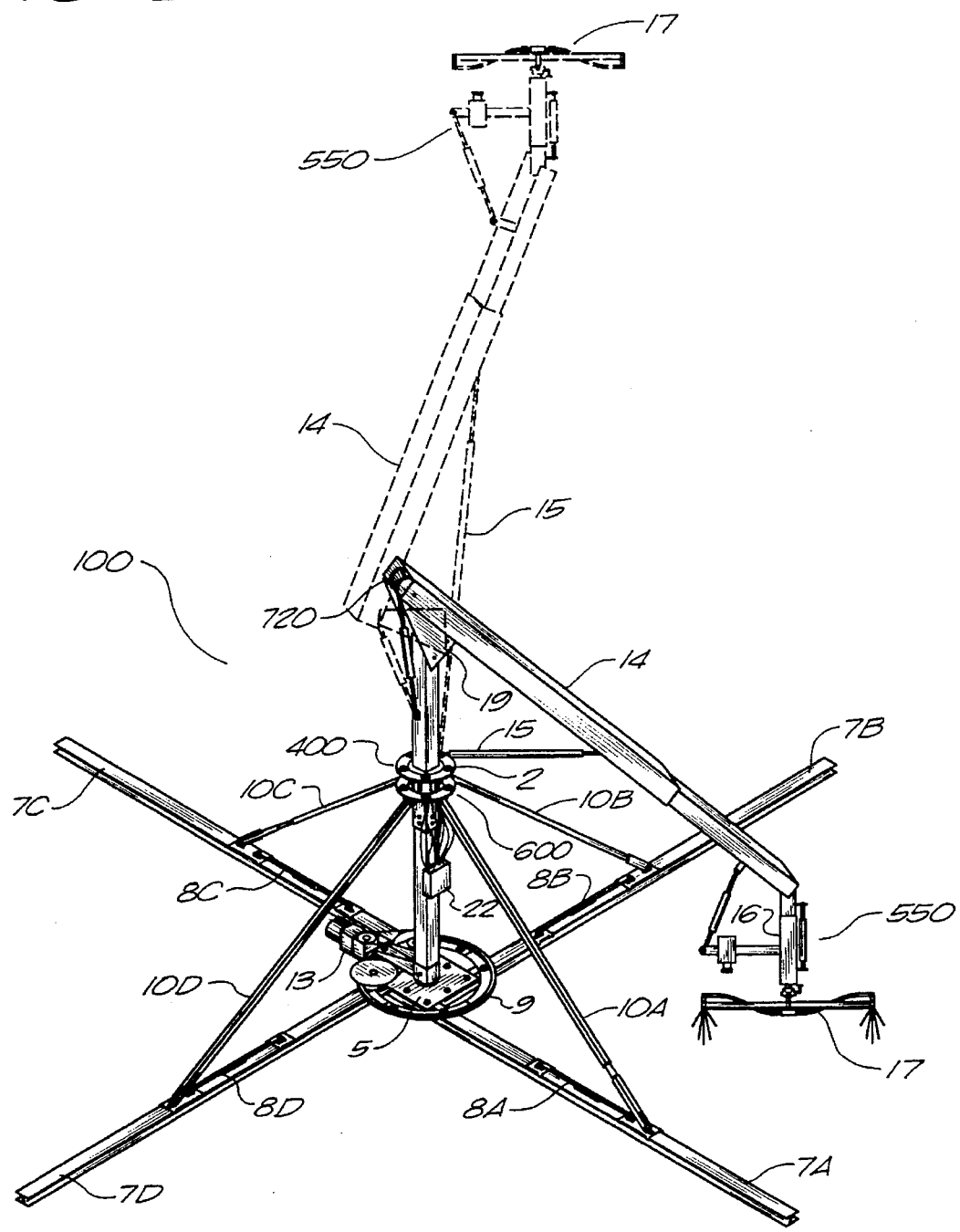
FIG. 2 depicts another frontal perspective view of the apparatus depicted in FIG. 1, with the boom assembly portion thereof articulated in two different positions relative to the interior surfaces of a storage tank.
Figure 7:
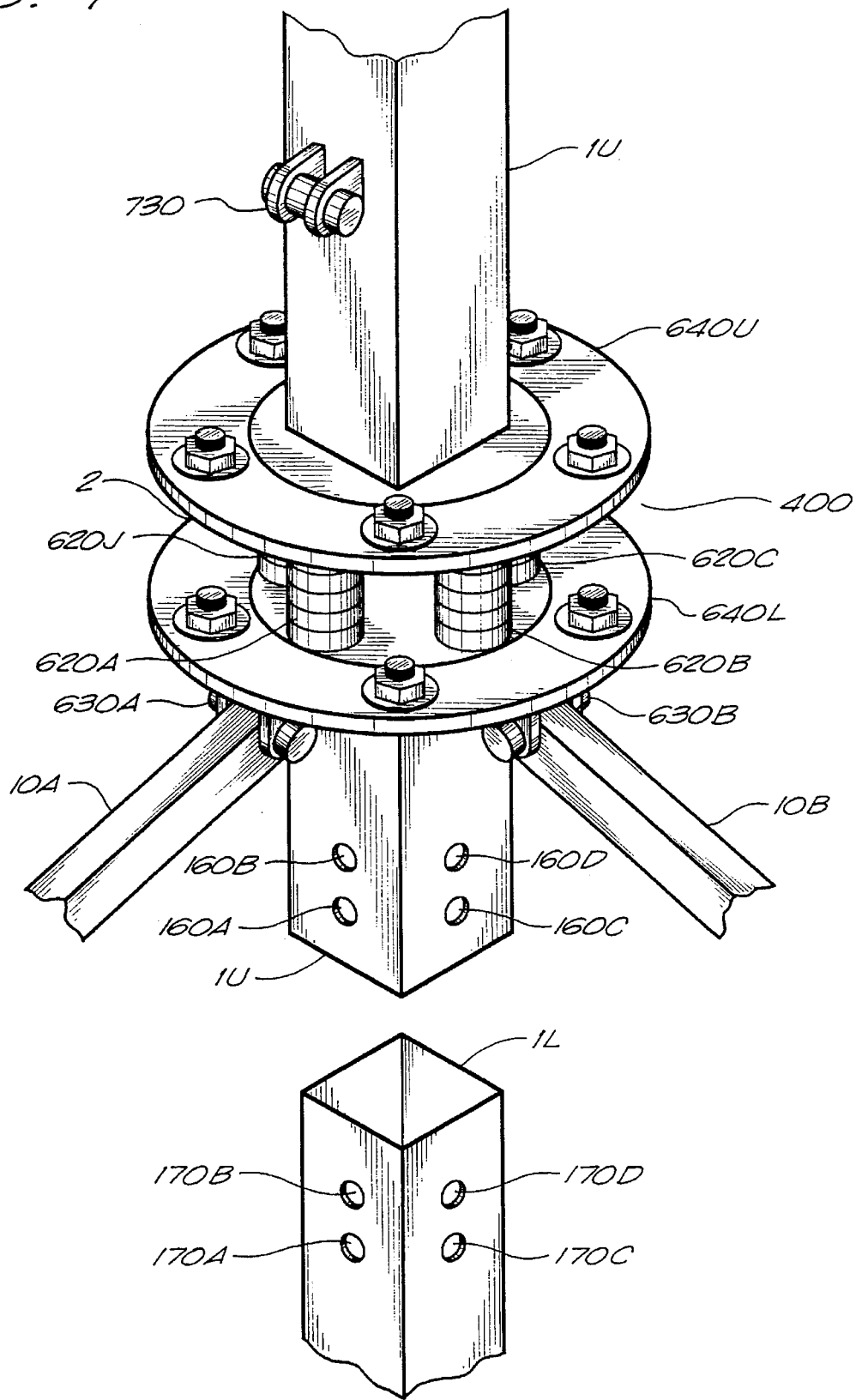
FIG. 7 depicts an enlarged view of a portion of the apparatus depicted in FIG. 2.

Referring to FIGS. 1 and 2, it is seen that apparatus 100 comprises pole 1 supported at its base by tracker assembly 300 and supported medially by ring assembly 400, and reaching the interior surfaces of wall 210, floor 215 and dome 220 with boom assembly 500 rotatably attached to pole 1. Referring to FIG. 7, pole 1 comprises an upper pole portion 1U and a corresponding lower pole portion 1L, which are configured to be securely but easily assembled and disassembled. In particular, lower pole portion 1L and upper pole portion 1U are separately placed onto floor 215 of storage tank 200 through manway 225 and joined by aligning corresponding sockets or the like, and then securing their joinder using bolts or the like through corresponding holes 160A–D and 170A–D. Accordingly, as upper pole portion 1U and lower pole portion 1L are joined, hole 160A in upper pole portion 1U is aligned with hole 170A in lower pole portion 1L, and then preferably secured with a suitable bolt. Similarly, holes 160B–D in upper pole portion 1U are each aligned with corresponding holes 170B–D in lower pole portion 1L, and then preferably secured with suitable bolts. As will be hereinafter described in detail, the assembly of pole portions 1U and 1L provide rotatable support for boom assembly 500.

Referring now to FIGS. 2 and 7, ring assembly 400 comprises pole beating 2 and outrigger means 600, which preferably comprises four outrigger arms 10A–D. Pole beating ring 2 is fixedly and circumferentially attached to upper pole portion 1U and allows pole 1 to rotate while providing support therefor. In the preferred embodiment of the present invention, pole beating ring 2 comprises pair of upper ring plate 640U and lower ring plate 640L and ten cam roller bearings 620 A–J. The upper end of each four outrigger arms 10A–D are pivotally connected to pole beating ring 2 at hinge means 630A–D, respectively.

Figure 5:
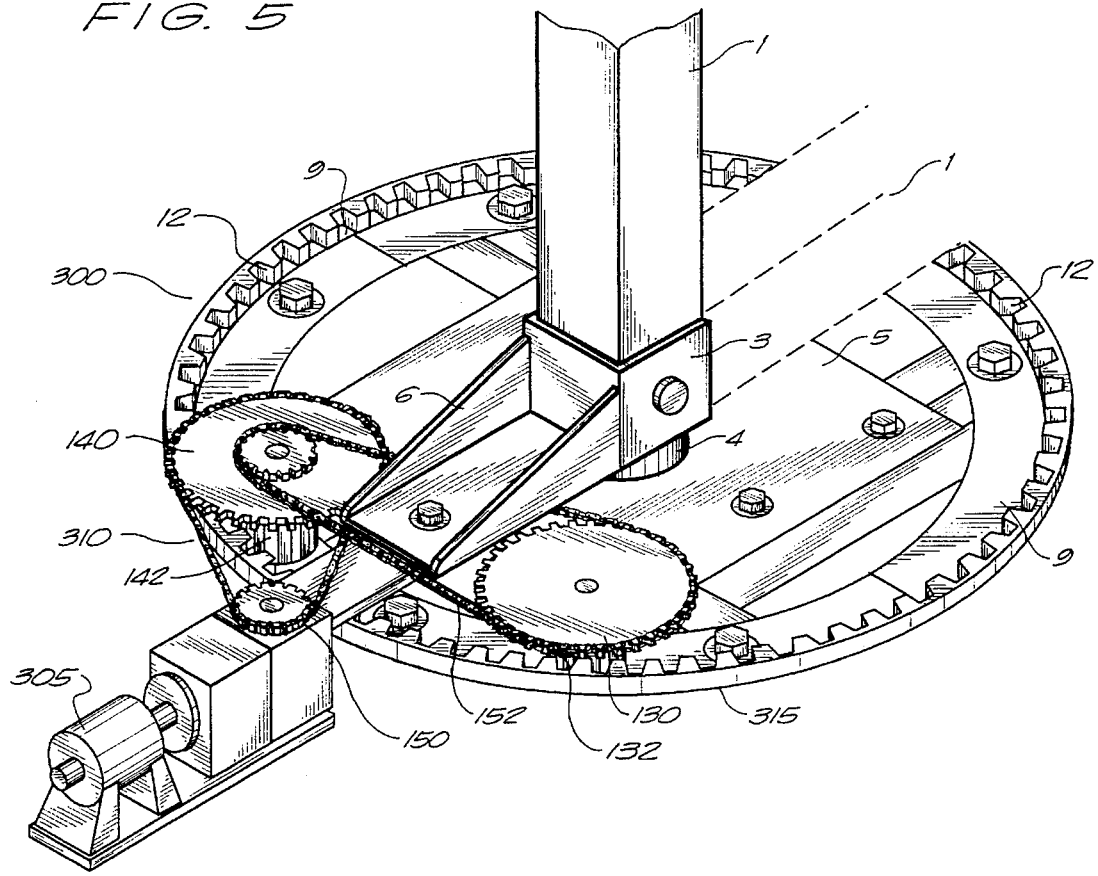
FIG. 5 depicts a enlarged frontal partial cut-away perspective view of a portion of the apparatus depicted in FIG. 2.

As will be hereinafter described in detail, pole 1 is caused to rotate at various speeds by tracker assembly 300. Referring to FIGS. 2 and 5, tracker assembly 300 is driven by hydraulic motor means 305 in combination with gear reduction means 310. As will become apparent to those skilled in the art, to attain specific rates of rotation of pole 1, an appropriate hydraulic motor means 305 and gear reduction means 310 may be easily changed at floor level of storage tank 200.

In the preferred embodiment of the present invention, referring to FIGS. 2–5, support and track means 315 preferably comprises four corresponding platform legs 7A–D which are typically constructed from conventional steel I-beams. Each of these platform legs 7A–D are fixedly received, in turn, by pole mount plate 5 and then by tracker ring 9, and preferably bolted thereto. As will become evident to those skilled in the art, pole mount plate 5 is fixedly attached to platform legs 7A–D and covers the radial junction thereof. Slidably affixed upon platform legs 7A–D are turnbuckles 8A–D, respectively, which are, in turn, pivotally attached to outrigger arms 10 A–D, respectively.

Figure 3:
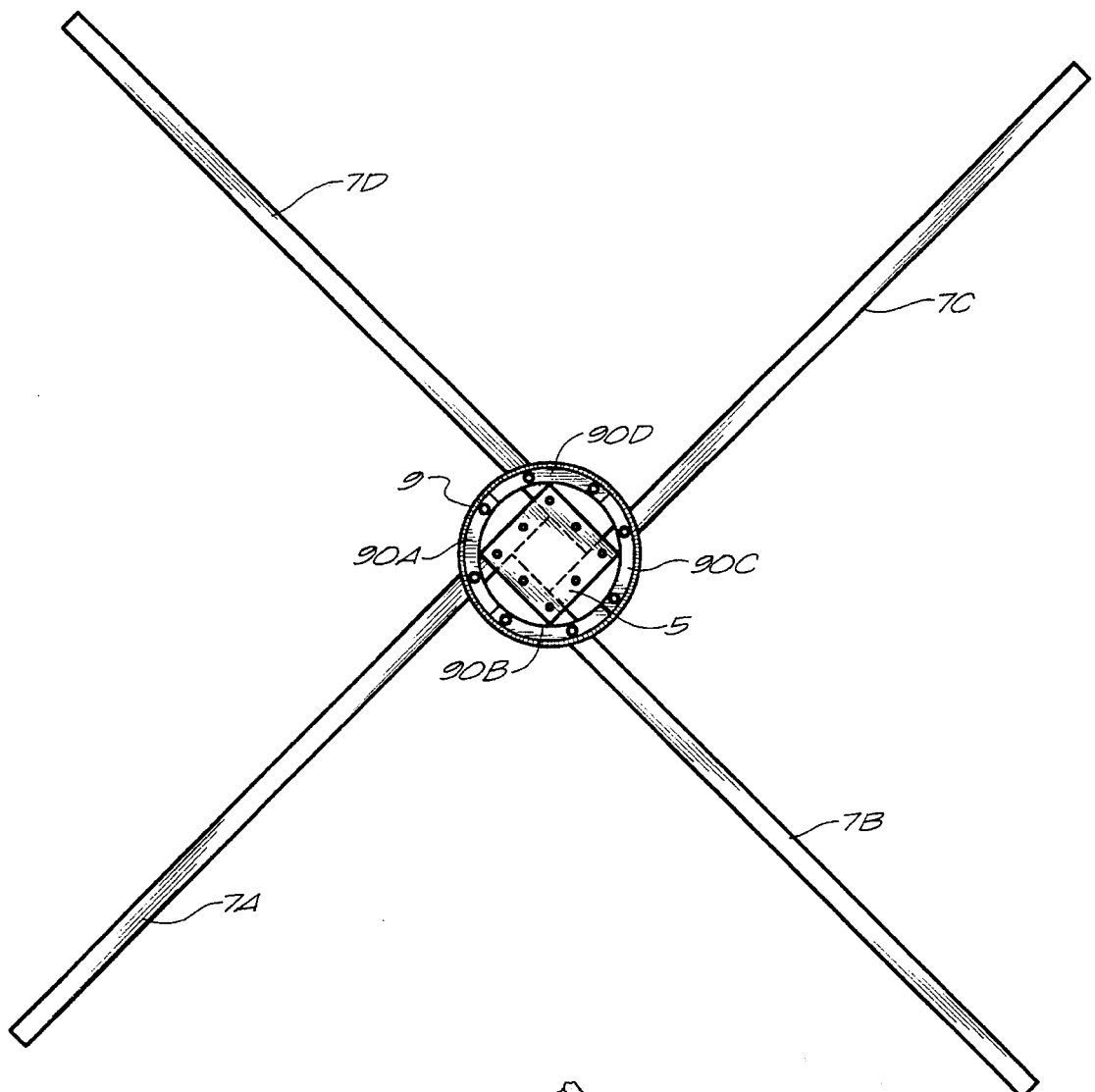
FIG. 3 depicts a cut-away top view of a portion of the apparatus depicted in FIG. 2.
Figure 4:
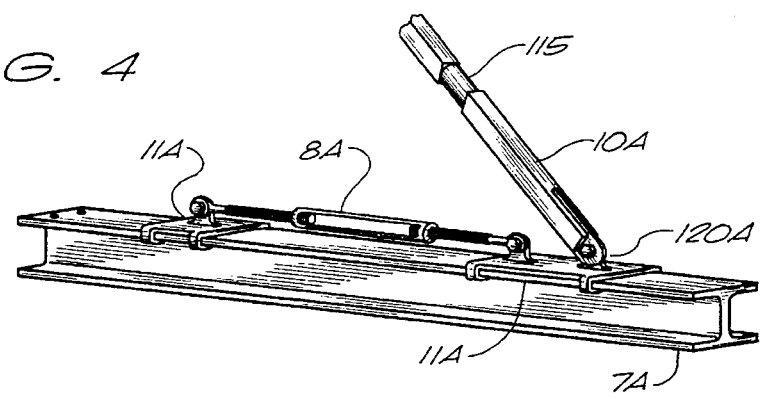
FIG. 4 depicts a frontal perspective view of a portion of the apparatus depicted in FIG.

As illustrated in the enlarged frontal perspective view of turnbuckle 8A depicted in FIG. 4, rambuckle 8A enables tightening or loosening of outrigger arm 10A to adjust the plumb of pole 1 and, of course, the rigidity and stability thereof in conjunction with boom assembly 500. Outrigger turnbuckle 8A is fixedly attached to pair of slide means 11A and 111A. Slide means 11A is pivotally attached to outrigger arm 10A preferably by hinge means 120A. As clearly shown, slide means 11A–D and 111 A–D are configured to be slidably received by the I-beam construction of platform legs 7A–D, respectively. Similarly, according to the teachings of the present invention, outrigger slide means 11A–D and 11 1A–D enable adjustments to the plumb of pole 1 by providing a convenient means for linearly moving outrigger arms 10A–D along corresponding platform legs 7A–D, in a manner that will be appreciated by those skilled in the art. It is also within the teachings of the present invention to impart a "double-jointed" character to one or more of the platform legs to assure setup of the pole and boom into a vertical disposition being a convenient and safe procedure. Ergo, as shown in FIG. 4, outrigger arm 10A may be advantageously constructed with full 360° pivot means 115 to permit outrigger arm 10A to exhibit double-jointed behavior as needed to promote erectifying the pole-boom combination of the present invention. It has been discovered that such full 360° pivot means should preferably be incorporated into a pair of opposite outrigger arms, preferably front and back outrigger arms. Thus, referring to FIGS. 2–4, outrigger arms 10A and 10C should preferably have this extensively pivotability. It has also been discovered that slide means affixed to outrigger arms 10A and 10C may be constructed with a similar pivotability feature to further assure expeditious setup of the instant pole-boom combination.

As depicted in FIGS. 2 and 3, tracker ring 9 preferably comprises four crescent-shaped plates 90A–D that, during assembly of tracker assembly 300 within storage tank 200, are configured to be fixedly attached together to form a flat circular ring. Thus, crescent-shaped plate 90A is fixedly attached at one end thereof to one end of crescent-shaped plate 90B, in an overlapping relationship therewith. The other, opposite end of crescent-shaped plate 90A is fixedly attached to one end of crescent-shaped plate 90D, in an overlapping relationship therewith. Similarly, one end of crescent-shaped plate 90C is fixedly attached to the opposite end of crescent-shaped plate 90B, in an overlapping relationship therewith; the other, opposite end of crescent-shaped plate 90C is fixedly attached to the opposite end of crescent-shaped plate 90D, in an overlapping relationship therewith. As will be evident to those skilled in the art, this overlapping preferably bolted joinder of crescent shaped plates 90A–D forms a solid circular shape, constituting tracker ring 9. Tracker ring 9 is fixedly attached to platform legs 7A–D by bolts or the like.

Figure 6:
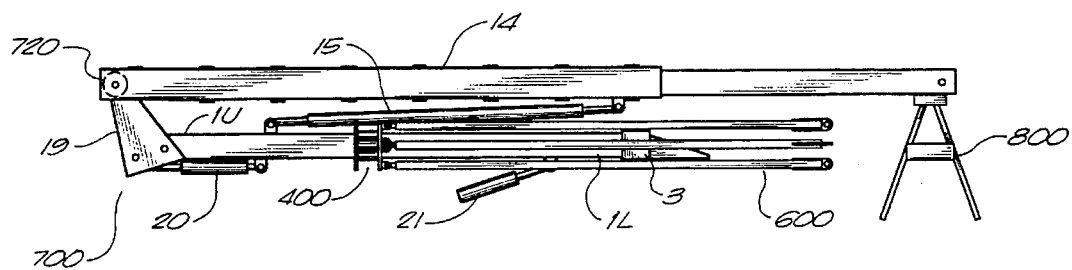
FIG. 6 depicts a front view of the apparatus depicted in FIG. 2, lying on a storage tank floor prior to said apparatus being setup in a vertical position.

Referring now to FIGS. 2,5, and 6, tracker assembly 300 further comprises pole mount plate 5, stirrup 3, load bearing 4 and tracker mount 6 preferably in a unitized construction. As will be herein described, during operation of the present invention, pole stirrup 3 supports pole 1 in an erect disposition. From a horizontal position upon tank floor 215, lower pole portion 1L of pole 1 is attached to stirrup 3 (see dotted line in FIG. 5) and then, after upper pole portion 1U is joined with lower pole portion 1L, pole 1 is raised into an erect vertical position by the action of setup cylinder 21. As pole 1 is raised from a horizontal to a vertical position in stirrup 3, setup cylinder 21 bottoms-out and tracker mount 6, disposed adjacent stirrup 3, functions as a safety-stop by providing a cantilever effect to prevent vertically-positioned pole 1 from moving past the vertical. As will become clear to those skilled in the art, pole load bearing 4 carries the load engendered by pole 1 and boom assembly 500 and also allows radial movement of the combination of pole 1 and boom assembly 500.

Referring now to FIGS. 2 and 5, tracker assembly 300 further comprises tracker bull gear 12 which is configured to mesh with gear reducer means 310. According to the present invention, bull gear 12 is typically inserted into storage tank 200 in at least two pieces or sections of gears which are bolted together to form a circular configuration. As will be appreciated by those skilled in the art, in the preferred embodiment of the present invention, either gears 132 or gears 142 of tracker 13 engage corresponding gears of bull gear 12, in a manner well known in the art, to cause variation of the speed of rotation driven by hydraulic motor 305 as hereinbefore described. Tracker 13 mounts upon tracker ring 9 within the unitized assembly including tracker mount 6 and swiveling stirrup 3. Depending upon the predetermined appropriate speed of rotation, bull gear 12 engages gears 142 of sprocket 140 or gears 132 of sprocket 130. In a manner well known in the art, chain 150 links sprocket 140 to hydraulic motor 305 and chain 152 links sprocket 130 to sprocket 140.

Thus, to cause normal rotation of the present invention, drive gear 142 is meshed with driven bull gear 12. On the other hand, to cause slower rotation, drive gear 132 is meshed with driven gear 12; since driven gear 132 is encumbered with the effect of both chain 150 and chain 152, slower rotational speed of pole 1 results. Accordingly, when tracker 13 is mounted onto the unitized tracker ring, engaging stationary tractor ball gear 12 and tracker ring 9, the combined action of hydraulic motor means 305 and gear reduction means 310 causes rotation of pole 1 and interconnected boom assembly 500 at various speeds.

Figure 8:
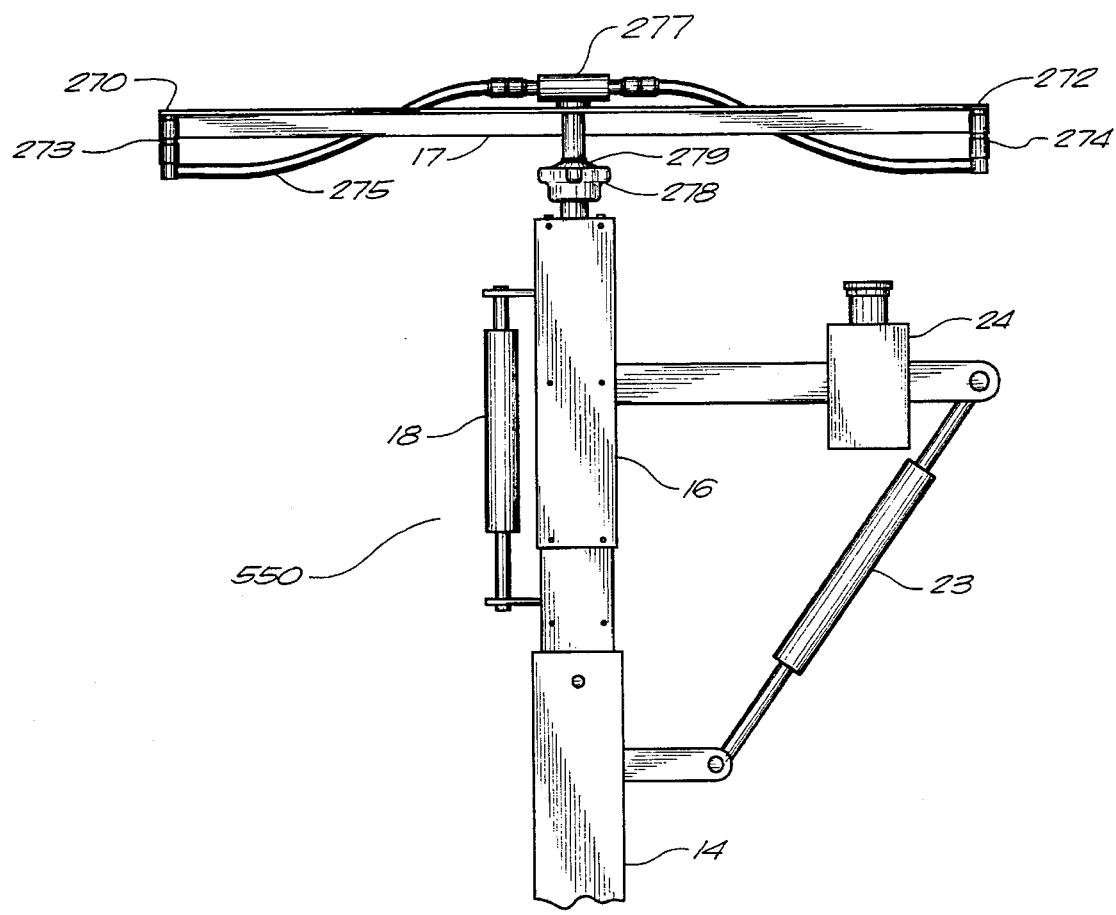
FIG. 8 depicts an enlarged top view of a portion of the apparatus depicted in FIG. 2.

Now referring to FIGS. 1–2 and 8, boom assembly 500 comprises telescopic boom arm 14, boom cylinder 15, fin assembly 700 and rotor assembly 550. Boom cylinder 15 consists of a hydraulic cylinder specially designed to support not only the boom weight, but also support the water blast thrust load at a position close to the load center and to allow boom position access to 130°—from near vertical— to blast the entire dome, to 40° past or below horizontal to blast the outer band of the floor. The range of positions through which telescopic boom 14 can be articulated are exemplified in FIGS. 1 and 2. According to the teachings of the present invention, telescopic boom 14 may be controlled to articulate rotor assembly 550 to effect a proximity of spray to interior surfaces of storage tank 200 hereinbefore unknown in the art. As will be described in detail, the present invention enables rotor support 16 to be positioned within mere inches of storage tank interior walls 205, dome 215 and floor 220 with unexpected accuracy and regularity. Accordingly, boom assembly 500 may be maneuvered to effectively provide a spray with a sufficient rotational blast pattern to clean and/or strip debris and the like from a storage tank's interior surfaces.

Referring specifically to FIG. 8, rotor support cylinder 18 controls the angle of rotor support 16 in both directions past parallel with telescopic boom 14 so that spray bar 17 can be positioned parallel with the storage tank walls or follow the contour of its dome. In the actual blasting, it has been found that optimal performance is achieved when spray bar 17 rotates at adjustable speeds and engages with tracker 13 to clean or strip approximately a five foot horizontal band through a 360° arc inside the storage tank. The width of the band which is sprayed or blasted during a 360° pass or run of the present invention is controlled by the predetermined distance between swivel nozzle pair 270 and 272 affixed to each end of spray bar 17. Also shown is hose 275 which carries water or other blasting fluid from T-connector 277 to nozzles 270 and 272. As should be clear to those skilled in the art, an external water source communicates water through suitable lines to connector 277. Connector 277 is attached to rotor support 16 by hammer-on 278. Rotor swivel 279 and respective nozzle swivels 273 and 274 enable spray or blast bands to have sufficient penetrating power to effectively clean and strip the interior surfaces of a storage tank and the like.

It is a feature and advantage of the present invention that there is synchronous engagement between rotational speed of spray bar 17 about swivel 279 and rotational speed of tracker 13 about pole 1. As is well known in the art, each hydraulic cylinder of the present invention has two lines to accommodate the feed and return of hydraulic fluid. For rotor assembly 550, the return line from rotor motor contained in rotor support 16 feeds tracker motor 305. In accordance with the present invention, based upon this synchronicity, if and when rotor assembly 550 hangs up and ceases rotation because of surface anomalies in the rubber lining or interference from storage tank structures and the like, tracker 13 likewise ceases rotational operation. This behavior, of course, provides a unique fail-safe wherein tracker does not continue to cause rotation of pole 1 and interconnected boom assembly 500 if there is no longer rotation of rotor assembly 550. To resume rotational operation of rotor assembly 550, the proximity of spray bar 17 is adjusted and then an appropriate adjustment is made to tracker motor 305; when operation of tracker 13 resumes, the corresponding rotational operation of rotor assembly 550 synchronously resumes due to the communication of the hydraulic fluid flowing between the rotor motor and the tracker motor, as hereinbefore described.

Another novel feature of the present invention is its ability to remotely control the proximity of blast nozzle means 17 of rotor assembly 550 to the interior surface to be blasted by water and the like. As is well known in the art, depending upon the nature of the surface and materials affixed thereon, different distances of spray liquid from these surfaces are prerequisite for effective cleaning and stripping to be accomplished. Furthermore, even though those skilled in the art may predict the optimal blast proximity prerequisite for effective cleaning and stripping of a particular tank storing a particular material, anomalies may occur during the blasting operation. It would thus be advantageous if an operator could visually or otherwise monitor the progress of blasting and then make appropriate adjustments of the blast stream to thoroughly clean and strip the subject surfaces. As will become apparent to those skilled in the art, the present invention achieves these goals.

Still referring to FIG. 8, according to the teachings of the present invention, rotor assembly 550 comprises rotor support 16 including a hydraulic motor, nozzle swivel 279, proximity control cylinder 18, and nozzle spray bar 17. To provide sufficient flexibility for varying the distance between each nozzle 270 and 272 on spray bar 17, rotor support 16 is telescopic. Proximity control cylinder 18 extends and retracts telescopic blast rotor support 16 as the operator outside of the tank sees the need to adjust the proximity of nozzle spray bar 17 to the interior surfaces being blasted during a particular band-run. A video monitor outside of the storage tank is connected to video camera 24 positioned upon rotor assembly 50 provides visual information regarding the effectiveness of blasting and how even slight proximity changes relate to such effectiveness. It has been learned that proximity must be regularly adjusted for large storage tanks because such tanks usually have a varying radius.

It is also within the teachings of the present invention that to achieve fine proximity adjustments, laser beam technology may be used. Accordingly, a laser beam proximity indicator may be used for visual measuring within fractions of an inch the distance between a spray pattern and the interior surfaces contained within a band-run. In one embodiment, such precise laser beam proximity measurement may be effectuated by rotation of a pin point on the video screen.

As will be understood by those skilled in the art, referring to FIGS. 1 and 2, fin assembly 700 functions as the movable mount for telescopic boom 14. More particularly, fin assembly 700 comprises fin means 19 and fin cylinder 20. Fin means 19 is fixedly attached at its base end to the upper end of upper pole portion 1U and pivotally attached at its other end to telescopic boom 14, at boom pivot point 505. Fin cylinder 20 is pivotally attached at its cylinder end at medial point 730 (see FIG. 7) of upper pole portion 1U and is fixedly attached at its piston end to fin means 19. As will become apparent to those skilled in the art, fin cylinder means 20 controls positioning of boom 14 wherein the boom enjoys sufficient maneuverability and mobility to reach virtually all surfaces within a typical storage tank. By encompassing a series of approximately five-foot circumferential bands, boom 14 enables rotor assembly 550 to reach all interior surfaces of wall 205; in addition, the present invention conveniently reaches extreme positions including the center of dome 220 and floor 215. Indeed, the highest band enables effective cleaning and stripping of dome 220, while the lowest band enables similar cleaning and stripping of bottom of wall 205. In accordance with the teachings of the present invention, boom pivot point 505 is located on the outer arc describing the travel of fin 19, to provide suitable maneuverability of boom assembly 500. This extraordinary maneuverability and reachability of boom assembly 500 in combination with the synchronized extraordinary maneuverability and reachability of rotor assembly 550 enable the present invention to thoroughly clean and strip a storage tank and the like in a safe and efficient manner heretofore unknown in the art. As hereinbefore described, this cleaning and stripping is accomplished by hydraulically controlling the articulation of boom assembly 500 and rotor assembly 550 via a series of band-runs.

Referring now to FIGS. 1, 2 and 6, fin assembly 700 is also important during setup of the present invention after its disassembled structural components have been manually inserted into storage tank 200 through manway 225 or the like. It is shown that the position of the axis of fin 19 allows boom 14 to be assembled on storage tank floor 215 by extending the fin to the opposite side of pole 1 from the position used for normal operation. Setup cylinder 21 is attached to a platform leg and lower pole portion 1L, and when activated, forces the pole beam assembly of the present invention into a vertical position. Setup cylinder 21 is removed after this setup procedure is completed.

From the ground floor position within storage tank 200, all hydraulic functions may be controlled. Thus, an operator positions the boom and rotor assemblies hydraulically from a control station which has hydraulic valve bank means 22. According to the present invention, there are preferably two modes of valve control. In manual mode, an operator manually positioning rotor assembly 550 appropriately for a particular band-ran. In processing mode, the operator then sets valve bank 22 into remote operation and exits the storage tank; processing during a particular band-ran is either "on" or "off." Blasting of the interior surfaces contained in the band is performed while the operator is situated outside of the storage tank. Thus, this cleaning and stripping via water blasting and the like is controlled by on-off switch means and also speed control means, remotely. If a different band width is needed, then the operator invokes manual mode and replaces nozzle spray bar 17. As hereinbefore described, the distance between nozzle pair 270 and 272 (FIG. 8) determines the width of a band. It may be necessary during the cleaning and stripping of a storage tank to change the spray bar to reach a corner or to reach around an obstruction.

It is also within the teachings of the present invention that by using additional video cameras and longer hydraulic hoses, hydraulic valve bank 22 could be removed to the outside of a storage tank after ground floor setup. In such an embodiment of the present invention, a plurality of video cameras would be optimally affixed to the platform legs, boom assembly and rotor assembly to provide an accurate picture of pole-beam rotation relative to coverage of interior tank surfaces. Positioning of boom 14 and rotor assembly 550 could then be accomplished remotely, resulting in even less operator exposure time inside the storage tank.

As hereinbefore described, the present invention is assembled in situ within a storage tank to allow access to the interior thereof, through limited sized manways and other available openings. To walk-through this assembly of the preferred embodiment, reference is to FIGS. 1–8 collectively; it should be noted, however, that FIG. 6 is a simplified depiction of the present invention prior to be positioned in a vertical position under the action of setup cylinder 21. First, support and track means 315 is assembled. Platform legs 7A–D are disposed in a diagonal arrangement on tank floor 215. Next, unitized tracker ring assembly is mounted upon platform legs 7A–D and bolted thereto. Lower pole portion 1L is inserted into stirrup 3 of unitized tracker ring assembly, with the remote end of the lower pole portion preferably placed upon a portable support platform 800 to situate the pole substantially horizontally. Pin means are inserted through stirrup 3 with lower pole portion 1L in situ, and secured preferably with a Cotter Pin.

Setup cylinder 21 is then attached to lower pole portion 1L and one of platform legs 7A–D. Next, upper pole portion 1U is insertably received by lower pole portion 1L and the joinder secured with bolts through corresponding holes 160A–D and 170A–D. In the next step, fin 19 and fin cylinder 20 are attached to upper pole portion 1U. Boom cylinder 15 is then installed upon upper pole portion 1U and boom 14 is attached to fin 19. Then doublejointed outrigger arms 10A and 10C are bolted from medial ring assembly 400 to corresponding slide means 11A and 11C, respectively. Next the operator interconnects hydraulic valve bank 22 and clamps it to lower pole portion 1L.

The various hydraulic hoses, two for each hydraulic cylinder hereinbefore described in detail, are then interconnected to their respective valves. In particular, two hoses are interconnected for each of setup cylinder 21, boom cylinder 15, fin cylinder 20, rotor assembly cylinder 23 and proximity cylinder 18. In accordance with the present invention, each of these five hose pairs are draped over hose tender means 720 which is pivotally attached at the end of boom 14 adjacent fin cylinder 20. Preferably configured like a tire rim, hose tender 720 receives the plurality of hoses within a recess region which tends to keep the hoses orderly. Finally, a water hose is interconnected with rotor assembly 550, after passing over hose tender 720.

Now, the assembly depicted in simplified form in FIG. 6 is ready for "lift-off." The operator actuates setup cylinder 21 which is attached to lower pole portion 1L and a platform leg, e.g., 7A. As cylinder 21 bottoms-out, pole 1 attains a vertical position; tracker mount 6 functions as a safety-stop to prevent the structure from moving past the vertical and tipping over. Once the structure is erect, outrigger arms 10A–D are connected from medial ring 640L to corresponding turnbuckles 11A–D. These outrigger arms are adjusted with corresponding turnbuckles to establish a firm and stable vertical pole. Next the setup cylinder is removed and boom cylinder 15 is attached to boom 14. Boom 14 is raised by actuating boom cylinder 15. Then rotor assembly 550 is interconnected with boom 14, by pivotally attaching rotor support 16 with a pin which is secured with a Cotter Pin. A suitable spray bar 17 is then attached to rotor swivel 279 with quick-connect hammer-on 278. Finally, video camera 24 is attached to rotor assembly adjacent rotor cylinder 23 (cables not shown).

It should be apparent to those skilled in the art that the present invention significantly improves the art by eliminating the necessity for multi-level staging and the like for cleaning the walls and dome of storage tanks and the like. Operator time expended within a storage tank has been minimized and completely eliminated during actual blasting. Indeed, if the hydraulic valve bank taught by the present invention is installed outside of a storage tank and additional video cameras strategically installed throughout the various assemblies embodying the present invention, then the exposure of an operator to the inside of a storage tank is essentially limited to setup. This, of course, minimizing the exposure of an operator or operators to noise from conventional spray hand-guns and echoes, to foggy vision due to combined effects of heat and moisture. Operator safety has clearly been improved severalfold.

The present invention also significantly reduces the time for achieving cleaning and stripping of storage tanks and the like. For example, in one application of the present invention, a cleaning and stripping operation which manually typically expended four weeks, only required four days using the present invention. The duration of cleaning and/or stripping, of course, depends from the nature of the surface and whether just cleaning or stripping also is required. Furthermore, the unique proximity feature of the present invention becomes critical in applications in which stripping is necessary, instead of just cleaning slurries and sludge and the like. Those skilled in the art will appreciate that a typical five-foot band-run taught by the present invention may take from as little as two hours to as long as eight hours. In addition the apparatus taught by the present invention may also be used to scan a surface on a band-by-band basis to ascertain whether cleaning and the like is necessary.

It will also be appreciated that the ease and accessibility of adjusting rotational speed has heretofore been unknown in the art. Under the present invention, the inherent synchronization between the tracker located at the base of the vertical pole and the rotor which is articulated from the boom, provides flexibility and maneuverability which are ideal for effectively cleaning and stripping storage tanks and the like. This synchronized tracking assures uniformity of blast regardless of changes in hydraulic fluid temperature and other perturbations to smooth operation. Even differences in speeds of the tracker hydraulic motor and the rotor hydraulic motor are inherently normalized because both motors are essentially in the same hydraulic circuit. Accordingly, cleaning and stripping of storage tanks is simpler, safer and more reliable using the present invention than has been otherwise attainable by those skilled in the art.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. In a storage tank having a plurality of interior surfaces including a floor, side walls and a dome, a cleaning and stripping apparatus comprising:
    a pole mounted about a vertical axis;
    a support and tracker comprising:
        a plurality of platform legs configured for being disposed upon said floor of said storage tank,
        pole mounting means configured for fixedly receiving said plurality of platform legs with said plurality of platform legs disposed radially and horizontally outward from said pole mounting means and further configured for supporting said pole when said pole is disposed vertically of said floor,
        a tracker ring configured to be abutably received by said pole mounting means,
        a tracker configured for engaging said tracker ring for horizontally rotating said pole about its vertical axis, and
        a plurality of outrigger arms fixedly attached to said pole and pivotally attached to said plurality of platform legs for adjusting said vertical disposition of said pole and for imparting stability thereto;
    a fin assembly pivotally attached to said pole at an end thereof remote from said pole mounting means;
    a boom assembly pivotally attached at a first end to said fin assembly and said pole
    a rotor assembly pivotally attached to a second end of said boom assembly and comprising a spray bar means for blasting said surfaces of said storage tank by rotating said spray bar means about an axis of said rotor assembly; and
    hydraulic fluid supply valve control means connected to a plurality of hydraulic cylinders for hydraulically controlling maneuverability and articulation of said boom assembly and said rotor assembly for, in turn, controlling band width coverage of said interior surfaces by said spray bar means, and for synchronizing said rotational movement of said tracker with said rotational movement of said rotor assembly.

2. The apparatus recited in claim 1, wherein said pole comprises an upper pole portion and a lower pole portion with said upper pole portion configured to fixedly receive said lower pole portion.

3. The apparatus recited in claim 2, wherein said upper pole portion comprises a ring assembly pivotally attached to said upper pole portion and disposed medially thereof, with said plurality of outrigger arms extending radially therefrom and pivotally attached thereto.

4. The apparatus recited in claim 3, wherein said support and tracker means comprises a setup cylinder fixedly attached to said lower pole portion and of said plurality of platform legs for raising said pole into said vertical position within said storage tank.

5. The apparatus recited in claim 2, wherein said pole mounting means comprises adjacent pole swivel stirrup means for pivotally securing said lower pole portion.

6. The apparatus recited in claim 5, wherein said pole mounting means further comprises load bearing means therebelow for supporting the load engendered by said pole and said boom assembly and said rotor assembly.

7. The apparatus recited in claim 5, wherein said tracker ring comprises a tracker bull gear for meshing with a corresponding drive gear of said tracker and, in turn, for synchronously causing rotation of said pole about said vertical axis thereof and of said bar means about said axis of said rotor assembly.

8. The apparatus recited in claim 9, wherein said tracker comprises a combination of a hydraulic motor and a gear reduction means, said gear reduction means configured to mesh with said tracker bull gear for controlling said synchronized rotation of said pole and of said spray bar means.

9. The apparatus recited in claim 8, wherein said pole mounting means, said pole swivel stirrup means and said tracker ring are of unitized construction.

10. The apparatus recited in claim 1, wherein each of said plurality of platform legs comprises a plurality of turnbuckles slidably attached thereto for adjusting said vertical disposition of said pole and for affording rigidity to said attached fin assembly and said boom assembly.

11. The apparatus cited in claim 1, wherein said fin assembly includes a fin and a fin cylinder for articulating said boom assembly relative to said interior surfaces.

12. The apparatus recited in claim 1, wherein said boom assembly includes a boom and a boom cylinder for articulating said rotor assembly relative to said interior surfaces.

13. The apparatus recited in claim 1, wherein said rotor assembly comprises proximity control means for positioning said spray bar means proximal to said interior surfaces.

14. The apparatus recited in claim 1, wherein said spray bar means comprises a pair of spaced-apart nozzles disposed at each end thereof for establishing said band width coverage upon said interior surfaces.

15. In a storage tank having a plurality of interior surfaces including a floor, side walls and a dome, a cleaning and stripping apparatus comprising:

a pole mounted about a vertical axis and comprising an upper pole portion and a lower pole portion with said upper pole portion configured to fixedly receive said lower pole portion;

a support and tracker comprising:
  a plurality of platform legs configured for being disposed upon said floor of said storage tank,
  pole mounting means configured for fixedly receiving said plurality of platform legs with said plurality of platform legs disposed radially and horizontally outward from said pole mounting means and further configured for supporting said pole when said pole is disposed vertically of said floor,
  a tracker ring configured to be abutably received by said pole mounting means,
  a tracker configured for engaging said tracker ring for horizontally rotating said pole about its vertical axis, and
  a plurality of outrigger arms fixedly attached to said pole and pivotally attached to said plurality of platform legs for adjusting said vertical disposition of said pole and for imparting stability thereto;

said upper pole portion comprising a ring assembly pivotally attached to said upper pole portion and disposed medially thereof, with said plurality of outrigger arms extending radially therefrom and pivotally attached thereto;

a fin assembly pivotally attached to said pole at an end thereof remote from said pole mounting means;

a boom assembly pivotally attached at a first end to said fin assembly and said pole said fin assembly comprising a fin and a fin cylinder for articulating said boom assembly relative to said interior surfaces;

a rotor assembly pivotally attached to a second end of said boom assembly and comprising a spray bar means for blasting said surfaces of said storage tank by rotating said spray bar means about an axis of said rotor assembly;

said boom assembly comprising a boom and a boom cylinder, for articulating said rotor assembly relative to said interior surfaces;

each of said plurality of platform legs comprising a plurality of turnbuckles slidably attached thereto for adjusting said vertical disposition of said pole and for affording rigidity to said attached fin assembly and said boom assembly;

said spray bar means comprising a pair of spaced-apart nozzles disposed at each end thereof for establishing [said]band width coverage by said spray bar means upon said interior surfaces; and hydraulic fluid supply valve control means connected to a plurality of hydraulic cylinders for hydraulically controlling maneuverability and articulation of said boom assembly and said rotor assembly for, in turn, controlling said band width coverage of said interior surfaces by said spray bar means, and for synchronizing said rotational movement of said tracker with said rotational movement of said rotor assembly.

16. The apparatus recited in claim 15, wherein said pole mounting means comprises adjacent pole swivel stirrup means for pivotally securing said lower pole portion.

17. The apparatus recited in claim 16, wherein said pole mounting means further comprises load beating means therebelow for supporting the load engendered by said pole and said boom assembly and said rotor assembly.

18. The apparatus recited in claim 5, wherein said tracker ring comprises a tracker bull gear for meshing with a corresponding drive gear of said tracker and, in turn, for synchronously causing rotation of said pole about said vertical axis thereof and of said spray bar means about said axis of said rotor assembly.

19. The apparatus recited in claim 18, wherein said tracker comprises a combination of a hydraulic motor and a gear reduction means, said gear reduction means configured to mesh with said tracker bull gear for controlling said synchronized rotation of said pole and of said spray bar means.

20. The apparatus recited in claim 19, wherein said pole mounting means, said pole swivel stirrup means and said tracker ring are of unitized construction.

21. The apparatus recited in claim 15, wherein said rotor assembly comprises proximity control means for positioning said spray bar means proximal to said interior surfaces.

22. In a storage tank having a plurality of interior surfaces including a floor, side walls and a dome, a cleaning and stripping apparatus comprising:

a pole mounted about a vertical axis and comprising an upper pole portion and a lower pole portion with said upper pole portion configured to fixedly receive said lower pole portion;

a support and tracker comprising:
  a plurality of platform legs configured for being disposed upon said floor of said storage tank,
  pole mounting means configured for fixedly receiving said plurality of platform legs with said plurality of platform legs disposed radially and horizontally outward from said pole mounting means and further configured for supporting said pole when said pole is disposed vertically of said floor,
  a tracker ring configured to be abutably received by said pole mounting means,
  a tracker configured for engaging said tracker ring for horizontally rotating said pole about its vertical axis, and
  a plurality of outrigger arms fixedly attached to said pole and pivotally attached to said plurality of platform legs for adjusting said vertical disposition of said pole and for imparting stability thereto;

said upper pole portion comprising a ring assembly pivotally attached to said upper pole portion and disposed medially thereof, with said plurality of outrigger arms extending radially therefrom and pivotally attached thereto;

a fin assembly pivotally attached to said pole at an end thereof remote from said pole mounting means;

a boom assembly pivotally attached at a first end to said fin assembly and said pole said fin assembly comprising a fin and a fin cylinder for articulating said boom assembly relative to said interior surfaces;

a rotor assembly pivotally attached to a second end of said boom assembly and comprising a spray bar means for blasting said surfaces of said storage tank by rotating said spray bar means about an axis of said rotor assembly;

said rotor assembly comprising proximity control means for positioning said spray bar means proximal to said interior surfaces;

said boom assembly comprising a boom and a boom cylinder, for articulating said rotor assembly relative to said interior surfaces;

each of said plurality of platform legs comprising a plurality of turnbuckles slidably attached thereto for adjusting said vertical disposition of said pole and for affording rigidity to said attached fin assembly and said boom assembly;

said pole mounting means comprising adjacent pole swivel stirrup means for pivotally securing said lower pole portion and further comprising load bearing means therebelow for supporting the load engendered by said pole and said boom assembly and said rotor assembly;

said pole mounting means, said pole swivel stirrup means and said tracker ring having an unitized construction;

said tracker ring comprising a tracker bull gear for meshing with a corresponding drive gear of said tracker and, in turn, for synchronously causing rotation of said pole about said vertical axis thereof and of said spray bar means about an axis of said rotor assembly;

said tracker comprising a combination of a hydraulic motor and a gear reduction means, said gear reduction means configured to mesh with said tracker bull gear for controlling said synchronized rotation of said pole and of said spray bar means;

said spray bar means comprising a pair of spaced-apart nozzles disposed at each end thereof for establishing band width coverage by said spray bar means upon said interior surfaces; and hydraulic fluid supply valve control means connected to a plurality of hydraulic cylinders for hydraulically controlling maneuverability and articulation of said boom assembly and said rotor assembly for, in turn, controlling said band width coverage of said interior surfaces by said spray bar means, and for synchronizing said rotational movement of said tracker with said rotational movement of said rotor assembly.

23. A method for cleaning and stripping a storage tank having a plurality of interior surfaces including a floor, a plurality of walls and a dome, said storage tank having a manway for access of a worker thereinto, said method comprising the steps of:

inserting through said manway a disassembled pole, a setup cylinder, a plurality of hydraulic hoses, a water hose, a disassembled boom assembly, and a disassembled support and tracker;

affixing a plurality of platform legs of said support and tracker upon said floor;

arranging said plurality of platform legs in a diagonal disposition upon said floor;

mounting a tracker ring of said support and tracker upon said diagonally disposed plurality of platform legs;

mounting a tracker of said support and tracker upon said tracker ring for rotational engagement thereof;

positioning a lower pole portion of said pole in a stirrup of said tracker ring, for rotating said pole about a vertical axis;

telescopically interconnecting a setup cylinder with said lower pole portion and with one of said plurality of platform legs;

adjoining an upper pole portion of said pole with said lower pole portion;

fixedly attaching a fin of said boom assembly to said upper pole portion; telescopically attaching a fin cylinder of said boom assembly to said upper pole portion;

telescopically attaching a boom cylinder of said boom assembly to a boom arm of said boom assembly;

slidably attaching each of a plurality of outrigger arms to a corresponding turnbuckle fixedly attached to each leg of said plurality of platform legs;

connecting a plurality of pairs of hydraulic hoses from a hydraulic valve bank to said lower pole portion;

interconnecting each said pair of said plurality of pairs of hydraulic hoses respectively with each of said boom cylinder, said fin cylinder, and a rotor assembly cylinder and a proximity cylinder of said boom assembly, and with said setup cylinder for supplying hydraulic fluid thereto;

interconnecting a water hose with said rotor assembly of said boom assembly; actuating said setup cylinder and placing said pole into a vertical position;

adjusting each of said outrigger arms in each of said corresponding turnbuckles to firmly establish said vertical position of said pole ;

removing said setup cylinder;

raising said boom arm by actuating said boom cylinder;

pivotally interconnecting a rotor support of said rotor assembly with said boom arm;

pivotally attaching a rotor swivel to said rotor support and further attaching a spray bar having a plurality of nozzles to said rotor swivel;

telescopically attaching said proximity cylinder along a longitudinal axis of said rotor assembly for controlling the proximity of said plurality of nozzles to said interior surfaces;

telescopically attaching said rotor assembly cylinder to said rotor swivel for controlling orientation, relative to said proximal interior surfaces, of a camera fixedly attached to said rotor assembly;

initiating fluid flow through said plurality of hoses for actuating each of said boom cylinder, said fin cylinder, said rotor assembly cylinder and said proximity cylinder, and for activating a spray from said plurality of nozzles;

articulating said rotor swivel by rotating said fin cooperatively with said boom arm to form a spray band from said spray bar;

positioning said spray bar to control proximity of said nozzles to said interior surfaces;

hydraulically rotationally driving said tracker synchronously with simultaneous rotationally driving of said rotor swivel; and repeating said steps of articulating said rotor swivel, positioning said spray bar and hydraulically rotationally driving said tracker for cleaning and stripping all of said plurality of interior surfaces of said storage tank.

* * * * *